United States Patent Office 3,843,325
Patented Oct. 22, 1974

3,843,325
INDICATOR FOR THE DETECTION OF METAL IONS
Dieter Schmitt, Wilhelm Baumer, and Alfred Stein, Darmstadt, West Germany, assignors to Merck Patent Gesellschaft mit beschrankter Haftung, Darmstadt, West Germany
No Drawing. Filed Dec. 8, 1972, Ser. No. 313,444
Claims priority, application Germany, Dec. 15, 1971, P 21 62 122.7
Int. Cl. G01n 21/06
U.S. Cl. 23—230 R                14 Claims

ABSTRACT OF THE DISCLOSURE

Colorimetric indicator for the detection of metallic ions, comprising an absorbent carrier homogeneously impregnated with an alkali salt of dithiozone or of rubeanic acid chelating agent.

BACKGROUND OF THE INVENTION

This invention relates to semiquantitative colorimetric test strips useful for detecting metal ions.

In analytical investigations, one employs not only test papers by means of which a specific ion or chemical compound can be detected with maximum selectivity, but also for screening purposes those indicators which contain a reagent capable of forming colored complexes with several different metallic ions. Many such reagents are known in the art and include but are not limited to dithizone (diphenylthiocarbazone), rubeanic acid (dithiooxamide), dimethylglyoxime, cupferron, 8-hydroxyquinoline, o-phenanthroline, etc. In this connection, semiquantitative determinations are desirable if they could be obtained in a simple manner with the aid of test strips. Especially versatile reagents are dithizone and rubeanic acid. For example, dithizone forms colored chelate complexes with $Zn^{2+}$, $Ag^+$, $Cd^{2+}$, $Hg^+$, $Hg^{2+}$, $Mn^{2+}$, $Pb^{2+}$, $Tl^+$, $Cu^{2+}$ $Ni^{2+}$, and $Co^{2+}$; and rubeanic acid forms such complexes, for example, with $Ag^+$, $Cd^{2+}$, $Hg^+$, $Cu^{2+}$, $Ni^{2+}$, and $Co^{2+}$.

A test paper containing dithizone or rubeanic acid and capable of effecting semiquantitative determinations has not been known heretofore, since it has not been possible to apply dithizone or rubeanic acid homogeneously in stable form to a filter paper or other absorbent substrate. Therefore, the only commercial article heretofore available containing these reagents is a test paper containing dithizone crystals in a very irregular distribution. When immersing this test paper in a solution containing one or more of the above-mentioned metallic ions, a corresponding color is produced only at those portions of the pages which contain dithizone crystals. It is thus impossible to semiquantitatively evaluate the test paper using a color scale. The sensitivity of such test papers cannot be increased by applying the dithizone to the paper in a very finely divided form, since the finer the particles, the lower the stability and thus the shorter the shelf life.

One attempt made in recent times to increase the storage stability of a dithizone-impregnated indicator has been by imprisoning the chelating agent in a semipermeable polymeric matrix, and casting the composition in the form of a diaphragm as described in German Unexamined Published Application 2,057,237. However, the solution to be tested is not absorbed by this indicator; rather, the metallic ions to be detected must diffuse into the diaphragm. This takes an inordinately long period of time, so that rapid semiquantitative determinations cannot be conducted with such an indicator.

A further disadvantage of the conventional test papers is the formation of a concentration gradient upon the penetration of the solution into the paper, making it impossible to accurately compare the resultant surface color satisfactorily with a color scale. Consequently, the field of practical applications of a corresponding indicator paper heretofore employed is strictly limited.

OBJECTS OF THE INVENTION

Accordingly, it is a general object of this invention to provide improved broad spectrum colorimetric indicators for the semiquantitative detection of metal ions in solution.

Another object of the invention is to provide colorimetric test strip indicators of improved accuracy and sensitivity.

A further object of the invention is to provide colorimetric test strip indicators having improved shelf stability.

An additional object of the invention is to provide a new process for semiquantitative colorimetric detection of metal ions.

Still another object of the invention is to provide a process for preparing improved colorimetric indicators.

Upon further study of the specification and appended claims, further objects and advantages of this invention will become apparent to those skilled in the art.

SUMMARY OF THE INVENTION

Briefly, the above and other objects are attained in one aspect of this invention by providing a colorimetric test strip suitable for use in detecting one or more metal ions selected from the group consisting of $Ag^+$, $Cd^{2+}$, $Hg^+$, $Cu^{2+}$, $Ni^{2+}$ and $Co^{2+}$ which comprises an absorbent substrate homogeneously impregnated with 5–125 mg. per square meter of surface area of colorimetric indicators selected from the group consisting of alkali salts of dithizone and alkali salts of rubeanic acid.

DETAILED DESCRIPTION OF THE INVENTION

It has now been discovered that the above and other disadvantages can now be avoided by impregnating an absorbent substrate with impregnating solutions according to this invention. In this way, a shelf-stable indicator paper is obtained which, with test solutions having identical metallic ion concentration, ensures reproducible colorations. Using the novel indicator of the present invention, a sensitive and linear correlation is surprisingly attained between the metallic ion concentration and the thus-produced color depth. These indicators are thus substantially superior to the previously known indicating methods.

Accordingly, this invention relates to an indicator for the detection of metallic ions, consisting of an absorbent substrate containing a chelating agent, characterized in that the chelating agent is an alkali salt of dithizone or rubeanic acid, preferably an ammonium, lithium, sodium or potassium salt.

It is advantageous to provide that the indicator of this invention additionally contains alkali salts of weak acids, thickeners, and optionally thiourea.

Suitable absorbent substrates are all those customarily employed for such indicator reagents. The use of filter paper is most popular, but it is also possible to use other absorbent cellulose or synthetic resin products, glass fiber paper, etc.

Chelating agents are employed which form colored complexes with the metallic ion to be detected and which carry, as the essential, complex-forming grouping, the group —C(S)—NH—, capable of producing a tautomeric form [—C(SH)=N—]. Especially suitable chelating agents of this constitution are diphenylthiocarbazone (dithizone) and dithiooxamide (rubeanic acid).

Suitable alkali salts of weak acids include but are not limited to the ammonium, lithium, sodium, or potassium salts of weak inorganic or organic acids, i.e., of acids having an aqueous dissociation constant pK of 2 or higher, preferably 2–6, e.g., alkali carbonates, or the alkali salts of acetic acid, succinic acid, tartaric acid, citric acid, malic acid, malonic acid, and maleic acid, especially sodium carbonate or sodium acetate. In this connection, it is advantageous to use a large excess of the alkali salts of weak acids as compared to the chelating agent, e.g., a 100–6,000 fold excess in parts by weight.

The thickening agents optionally added to the impregnating solution serve to envelope the reagents after drying of the test papers, thereby affording additional protection against atmospheric oxygen and other damaging gases. Suitable thickeners include but are not limited to gelatin, polyvinyl alcohol, polymethacrylates, or hydroxypropylcellulose, which can be employed either individually or in mixture. The principal requirements of the thickening agent are that it be a film-forming material and that the resultant film be water soluble or permeable but retarding to oxygen and other gases. Many such films are known in the art.

The thiourea preferably added according to this invention exerts a stabilizing effect on dithizone and rubeanic acid. The thiourea is added in a stabilizing amount, i.e., 5–100 preferably 10–20 mole of thiourea per mole of indicator.

In a particular embodiment of the indicator, the absorbent substrate contains in alkali salt of dithizone or rubeanic acid, alkali salts of weak acids, thickener, and thiourea in the following concentrations:

| | Broad | Preferred |
|---|---|---|
| Alkali salt of dithizone or rubeanic acid, mg./m.² | 5–125 | 40–100 |
| Alkali salt of weak acids, g./m.² | 5–50 | 8–20 |
| Film-forming agent, g./m.² | 1.25–5 | 2–4 |
| Thiourea, g./m.² | 1.25–5 | 1.25–4 |

An impregnating solution is produced from these components, by means of which the absorbent substrate is impregnated. It is, of course, also possible to dissolve the components individually or in various subcombinations and to impregnate the absorbent substrate successively with the various solutions and dry the substrate after each impregnating step. If solubility conditions permit, it is normally advantageous to impregnate the absorbent substrate with a single impregnating solution containing all required components dissolved therein.

The following concentrations of impregnation agents are suitable for preparing test strips of the present invention:

| | Concentration, g./100 ml. | |
|---|---|---|
| Agent | Broad | Preferred |
| Dithizone alkali salt | 0.002–0.2 | 0.02–0.1 |
| Rubeanic acid alkali salt | 0.002–0.2 | 0.02–0.1 |
| Alkali salt of weak acid | 2–20 | 4–10 |
| Film-forming thickener | 0.5–2 | 1–2 |
| Thiourea | 0.5–2 | 0.5–1.5 |

In preparing the impregnating solution, for example, 2–200 mg. of the chelating agent and 0.5–2 g. of the thiourea are dissolved in 50 ml. of a volatile, water-miscible organic solvent, and 2–20 g. of an alkali salt of weak acids and 0.5–2 g. of the thickener are dissolved in 50 ml. of water. Suitable organic solvents include but are not limited to lower aliphatic alcohols, preferably of 1–6 carbon atoms and especially ethanol or methanol; it is also possible to use other volatile polar organic solvents wherein the organic components can be easily dissolved, e.g., dimethylformamide and dimethylsulfoxide.

The absorbent substrate, preferably filter paper, is impregnated conventionally either successively with different impregnating solutions in any desired sequence, or the impregnating solutions are combined prior to impregnation to form a single solution in which all components are dissolved in a mixture of the organic solvent with water, in which case ordinary care must be taken that the concentration ratios of the reagents are preserved. The thus-impregnated papers can either be cut as such into readily usable strips, or they can be processed into preferably square sections which, in turn, can be applied in a conventional manner to synthetic resin films, paper strips, or metal strips by gluing and/or by being sealed onto or into these supports.

For the detection of metallic ions, these test strips are immersed into the solution to be tested to saturate the testing zone. In the presence of metallic ions, the resultant testing zone color of a dithizone-impregnated paper depends on the metal taking part in the chelate formation and is violet, orange, red, or yellow. In the detection of zinc ions, for example, orange-red to deeply wine-red colorations are produced depending on the zinc (II) ion concentration. This coloring is compared, after about 30 seconds, with a standardized color scale, and the zinc ion concentration of the solution can readily be read off. The standardized reference color scale is prepared by testing known concentrations of specific detectable ions using the indicator strips of this invention. With this semiquantitative determination, marked graduations can be perceived between 5, 10, 25, 50, 100 and 250 mg./l. (p.p.m.) of zinc (II) ions. This indicator is thus distinguished by a very high sensitivity.

The following table illustrates the lower limits of detection of the metallic ions by means of the dithizone-impregnated test papers of the present invention:

| | Limits of detection (p.p.m.) | |
|---|---|---|
| Metallic ion | Dithizone | Rubeanic acid |
| $Zn^{++}$ | 0.5 | |
| $Ag^{+}$ | 5 | 100 |
| $Cd^{++}$ | 1 | |
| $Hg^{+}$ | 5 | 100 |
| $Hg^{++}$ | 5 | |
| $Pb^{++}$ | 2 | |
| $Tl^{+}$ | 5 | |
| $Cu^{++}$ | 5 | 10 |
| $Ni^{++}$ | 10 | 5 |
| $Co^{++}$ | 1 | 20 |

If the concentration of the metallic ion to be determined exceeds a certain upper limit (e.g. 250 mg./l. in case of zinc ions), then the solution to be tested, and/or an aliquot thereof, is diluted until a coloring is obtained within the color scale. By multiplying the readout value by the dilution factor, a semiquantitative indication of the metallic ion concentration is obtained.

If the thus-produced coloring of the test zone for a specific metallic ion deviates from the associated color scale, an interference exists due to other complex-forming metallic ions present in the solution. In this case, the interfering ions must be masked or separated by methods known in the art, e.g. before carrying out $Zn^{2+}$ ion determination $Cu^{2+}$, $Hg^{+}$ and $Hg^{2+}$ ions are removed by mixing with iron or cadmium powder, shaked for about one minute and filtered. $Tl^{+}$ ions are removed by the addition of potassium iodide; $Ni^{2+}$ ions by the addition of an alcoholic solution of dimethylglyoxime and following filtration.

The indicators of this invention exhibit considerable advantages over the heretofore known colorimetric indicating reactions for metallic ions. For the first time, a shelf-stable indicator has been developed which permits semiquantitative determination of a number of various metallic ions, without requiring a specific indicator for each metallic ion. Consequently, rapid semiquantitative determinations are made possible with a very high degree of sensitivity.

The invention will be explained in greater detail by the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

50 mg. of dithizone and 1 g. of thiourea are dissolved in 50 ml. of alcohol and mixed with a solution of 8 g. of sodium carbonate and 2 g. of gelatin in 50 ml. of water. A filter paper (Schleicher & Schuell No. 1450 CV, 2316, or 1451) is impregnated with the resultant solution and dried at 80° C. Test papers are cut into strips of a width of 6 mm. and sealed on a synthetic resin film tape 75 mm. wide. After cutting the film tape at right angles to the tape direction into 6 mm. wide strips, test strips are obtained having a length of 75 mm. and a width of 6 mm. carrying a test paper section of a size of 6 x 6 mm.

The test strip exhibits an orange-red coloring after immersion into a solution containing 10 mg./l. of zinc ions, corresponding to the appropriate value on the associated standardized color scale.

EXAMPLE 2

Filter papers of the type used in Example 1 are first impregnated with a solution of 20 mg. of dithizone and 2 g. of thiourea in 100 ml. of alcohol, dried at 60° C., and thereafter impregnated with a solution of 10 g. of sodium acetate and 2 g. of gelatin in 100 ml. of water and dried at 80° C. This indicator is likewise capable of effecting accurate semiquantitative determinations of zinc, silver, cadmium, mercury, lead, thallium, copper, nickel and cobalt ions.

EXAMPLE 3

A solution is prepared from 100 ml. of a water-ethanol mixture (1:1) and 10 mg. of dithizone, 0.5 g. of thiourea, 6 g. of potassium carbonate and 1 g. of polyvinyl alcohol. The filter papers set forth in Example 1 are saturated with this impregnating solution and then dried at 80° C.

A thus-produced test strip shows a red coloring a few seconds after immersion into a solution containing 10 mg./l. of lead ions, corresponding to the appropriate value on the associated reference color scale.

EXAMPLE 4

An impregnating solution is produced analogously to Example 2, but containing hydroxypropylcellulose in place of gelatin. The thus-prepared indicator indicates, after immersion into the test solution described in Example 1, a content of 10 mg./l. of zinc ions.

EXAMPLE 5

An impregnating solution is produced analogously to Example 1, but containing only 2 mg. of dithizone. A thus-produced indicator is similarly useful for conducting accurate semiquantitative determinations.

EXAMPLE 6

200 mg. of rubeanic acid and 1 g. of thiourea are dissolved in 50 ml. of methanol and mixed with a solution of 8 g. of potassium carbonate and 2 g. of polyvinyl alcohol in 50 ml. of water. After immersion into a solution containing 20 mg./l. of copper ions, an indicator impregnated with this solution shows a green coloring corresponding to the appropriate value on the associated color scale.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A shelf-stable absorbent colorimetric test strip suitable for use in detecting one or more metal ions selected from the group consisting of $Ag^+$, $Cd^{++}$, $Hg^+$, $Cu^{++}$, $Ni^{++}$ and $Co^{++}$, which comprises an absorbent substrate homogeneously impregnated with 5–125 mg. per square meter of surface area of a colorimetric indicator selected from the group consisting of alkali salts of dithizone and alkali salts of rubeanic acid.

2. An article according to Claim 1, wherein said colorimetric indicator is the ammonium, lithium, sodium or potassium salt of dithizone.

3. An article according to Claim 1, wherein said colorimetric indicator is the ammonium, lithium, sodium or potassium salt of rubeanic acid.

4. An article according to Claim 1, further comprising an alkali salt of a weak acid in excess of the amount of said colorimetric indicator.

5. An article according to Claim 4, where said excess is from 100 to 6,000 times the amount of said colorimetric indicator.

6. An article according to Claim 1, further impregnated with a water permeable or water soluble film which is impermeable to oxygen.

7. An article according to Claim 6, wherein said film is present in an amount of 1.25–5 mg. per square meter of surface area and is selected from the group consisting of gelatin, polyvinyl alcohol, polymethacrylate and hydroxypropylcellulose.

8. An article according to Claim 1, further comprising a colorimetric indicator stabilizing amount of thiourea.

9. An article according to Claim 8, wherein said thiourea is present in an amount of 1.25–5 mg. per square meter of surface area.

10. An article according to Claim 1, further comprising a masking agent for one or more of said metal ions.

11. An article according to Claim 1, consisting essentially of:
 (a) said colorimetric indicator;
 (b) 5–50 g./m.² of surface area of an alkali salt of a weak acid;
 (c) 1.25–5 g./m.² of surface area of a water soluble or water permeable but oxygen retarding film; and
 (d) 1.25–5 g./m.² of surface area of thiourea.

12. An article according to Claim 11, wherein said absorbent substrate is filter paper.

13. A process for preparing an article according to Claim 11, which comprises impregnating said absorbent carrier by saturation with one or more solutions containing:
 (a) 2–200 mg. of said colorimetric indicator in about 50 ml. of a volatile polar organic solvent;
 (b) 0.5–2 g. of thiourea in about 50 ml. of a volatile polar organic solvent;
 (c) 2–20 gm. of an alkali salt of a weak acid in about 50 ml. of water; and
 (d) 0.5–2 gm. of dithiourea in about ml. of water, and drying the impregnated test strip.

14. A process for the semiquantitative colorimetric detection of a metal ion selected from the group consisting of $Zn^{++}$, $Ag^+$, $Cd^{++}$, $Hg^+$, $Hg^{++}$, $Mn^{++}$, $Pb^{++}$, $Tl^+$, $Cu^{++}$, $Ni^{++}$ and $Co^{++}$ which comprises immersing an article according to Claim 1 into a solution to be tested and reading off a resultant color change.

References Cited

UNITED STATES PATENTS 3,635,679   1/1972   Bloch et al. _____ 23—253 TP

OTHER REFERENCES

Pender, "Spectrophotometric Det. of Cu in Ti and Ti Alloys by Dithizone Extraction," Anal. Chem., vol. 30, No. 12, December 1958, pp. 1915–1917.

Frieser et al., "On the Nature of the Enol or Secondary Series of Diphenylthiocarbazone Chelates," Anal. Chem., vol. 42, No. 2, February 1970, pp. 305–306.

RONALD E. SERWIN, Primary Examiner

U.S. Cl. X.R.

23—253 TP; 252—408

UNITED STATES PATENT OFFICE
CERTIFICATE OF CORRECTION

Patent No. 3,843,325      Dated October 22, 1974

Inventor(s) Dieter Schmitt, et al.

It is certified that error appears in the above-identified patent and that said Letters Patent are hereby corrected as shown below:

IN THE HEADING, COLUMN 1: The address for the Assignee of Record should read -- Darmstadt, Germany --.

Signed and sealed this 24th day of December 1974.

(SEAL)
Attest:

McCOY M. GIBSON JR.      C. MARSHALL DANN
Attesting Officer      Commissioner of Patents